United States Patent [19]

Grassens

[11] Patent Number: 5,177,640
[45] Date of Patent: Jan. 5, 1993

[54] TWO-AXIS MOVING COIL ACTUATOR

[75] Inventor: Leonardus J. Grassens, Monument, Colo.

[73] Assignee: Applied Magnetics Corporation, Goleta, Calif.

[21] Appl. No.: 773,146

[22] Filed: Oct. 8, 1991

[51] Int. Cl.$^5$ .............................................. G02B 7/02
[52] U.S. Cl. ................................... 359/814; 359/824
[58] Field of Search ............... 359/819, 822, 823, 824, 359/813, 814; 369/44.15, 44.16

[56] References Cited

U.S. PATENT DOCUMENTS

| | | |
|---|---|---|
| 4,449,213 | 5/1984 | Noborimoto et al. . |
| 4,504,935 | 3/1985 | Jensen . |
| 4,514,837 | 4/1985 | Van Rosmalen . |
| 4,568,142 | 2/1986 | Iguma . |
| 4,571,026 | 2/1986 | Maruta . |
| 4,596,444 | 6/1986 | Ushida . |
| 4,596,448 | 6/1986 | Kikuchi . |
| 4,643,522 | 2/1987 | Takashima . |
| 4,644,516 | 2/1987 | Musha . |
| 4,646,283 | 2/1987 | Ito et al. ........................ 359/814 |
| 4,669,073 | 5/1987 | Wakabayashi et al. . |
| 4,669,823 | 6/1987 | Iguma et al. . |
| 4,679,904 | 7/1987 | Kurihara . |
| 4,687,296 | 8/1987 | Terayama et al. ................ 359/814 |
| 4,702,555 | 10/1987 | Iguma et al. ...................... 359/814 |
| 4,740,946 | 4/1988 | Yumura et al. . |
| 4,763,314 | 8/1988 | McCaslin et al. . |
| 4,794,586 | 12/1988 | Korth . |
| 4,811,320 | 3/1989 | Kawasaki et al. . |
| 4,823,336 | 4/1989 | Inada et al. . |
| 4,842,392 | 6/1989 | Nakamura et al. . |
| 4,845,699 | 7/1989 | Kawasaki et al. . |
| 4,861,138 | 8/1989 | Suzuki ............................... 359/814 |
| 4,878,214 | 10/1989 | Hinotani ............................ 359/814 |
| 4,911,534 | 3/1990 | Beyersbergen van Henegouwen et al. . |

FOREIGN PATENT DOCUMENTS

| | | |
|---|---|---|
| 57-18037 | 1/1982 | Japan . |
| 58-64649 | 4/1983 | Japan . |
| 60-115031 | 6/1985 | Japan . |
| 60-129937 | 7/1985 | Japan . |
| 61-17230 | 1/1986 | Japan . |
| 61-182642 | 8/1986 | Japan . |
| 61-248241 | 11/1986 | Japan . |
| 62-205540 | 9/1987 | Japan . |

OTHER PUBLICATIONS

"New Magneto-Optic Head With A Built-In Generator For A Bias Magnetic Field," Kobori et al., Optical Data Storage Conference, Technical Digest Series, vol. 10, Mar. 11–13, 1987, pp. 186–189.

"Magnetooptic Erasable Disk Memory With Two Optical Heads," Murakami et al., Applied Optics, vol. 25, No. 22, Nov. 15, 1986, pp. 3986–3989.

"Erasable Magneto-Optical Recording Media," Hartmann et al., pp. 1013–1018, IEEE Transactions on Magnetics, vol. MAG-20, No. 5, Sep. 1984.

Primary Examiner—Loha Ben
Attorney, Agent, or Firm—Knobbe, Martens, Olson & Bear

[57] ABSTRACT

A two-axis electromagnetic actuator for positioning an objective lens in an optical recording system is disclosed wherein the objective lens is mounted on a lens holder. The lens holder is positioned within a magnetic field created by two pairs of permanent magnets. A tracking coil is wound around the lens holder and two focus coils are affixed to the tracking coil adjacent the permanent magnet pairs. The lens holder suspended between the magnet pairs by flexures supported on a circuit board. The circuit board further includes electrical contacts for supplying current to the focus and tracking coils in accordance with feedback signals generated by a servo system. The current through the coils interacts with the magnetic field produced by the magnets to move the lens holder and objective lens carried thereon and effect tracking and focusing of a laser beam exiting the lens upon the surface of an optical disc.

18 Claims, 5 Drawing Sheets

TWO-AXIS MOVING COIL ACTUATOR

FIELD OF THE INVENTION

The invention relates to optical disc recording systems and, in particular, to a two-axis electromagnetic actuator for focusing and tracking in optical disc players and recorders.

BACKGROUND OF THE INVENTION

Optical data storage systems that utilize a focused laser beam to record and instantaneously play back information are very attractive in the computer mass storage industry. Such optical data storage systems offer very high data rates with very high storage density and rapid random access to the data stored on the information medium, most commonly an optical disc. In these types of optical disc memory systems reading and writing data is often accomplished using a single laser source functioning at two respective intensities. During either operation, light from the laser source passes through an objective lens which converges the light beam to a specific focal point on the optical disc. During data retrieval, the laser light is focused on the recording medium and is altered by the information of the data storage medium. This light is then reflected off the disc, back through the objective lens, to a photodetector. It is this reflected signal that transmits the recorded information. It is thus especially important that, when information is being written to or read from the memory, the objective lens, and the exiting focused beam, be precisely focused at the center of the correct track so that the information may be accurately written and retrieved.

In order to attain a precise reading of the information stored on the disc, it is necessary to be able to move the objective lens in both a focusing (i.e., perpendicular to the plane of the disc) or Z direction in order to focus the laser beam to a small point of light on a precise location of the disc to write or retrieve information, and in a tracking (i.e., radial from the center of the disc) or Y direction to position the beam over the exact center of the desired information track on the disc. Focus and tracking corrections may be effected by moving the objective lens in either the direction of the optical axis of the lens for focusing, or in a direction perpendicular to the optical axis for tracking.

In these systems, the position of the objective lens in the focus and tracking directions is commonly adjusted by control systems. Actuators support the objective lens and convert position correction signals from the feedback control systems into movement of the objective lens. Most commonly, these actuators comprise moving coils, stationary magnets, and a stationary yoke, wherein a magnetic field is produced in an air gap between the yoke and magnets. U.S. Pat. No. 4,568,142 issued to Iguma and entitled "Objective Lens Driving Apparatus" illustrates an actuator of this type wherein the actuator includes rectangular magnets positioned within U-shaped yokes. The yokes are spaced from one another with their north poles opposing, in close enough proximity to one another to form a magnetic circuit. A square-shaped focusing coil is bonded to the outsides of a square-shaped lens frame. Four tracking coils are bonded on the corners of the focusing coil. The ends of the focusing coil are then positioned within the air gaps formed by each of the U-shaped yokes so that the focusing coil straddles the yokes. Because the focusing coil must extend around these "center" or "inner" yoke plates, the coil cannot be wound as tightly as desired and the rigidity of the coil construction is compromised. Further, in this type of closed magnetic circuit design, the majority of coil wire is positioned outside the air gaps, significantly reducing the efficiency of the actuator.

In most optical systems, the stiffness of the coil in the air gap has to be very high and the coil decoupling resonance frequency should be above 10 kHz, and is most desirably above 25 kHz. In many types of prior actuator designs, large amounts of coil wire in the magnetic air gap are often required to achieve maximum motor performance. To place such a large amount of coil within the air gap and still conform to the limited space constraints of the actuator design, the coil must be wholly or partially "freestanding", or must be wound on the thinnest bobbin possible. These types of coil configurations have low stiffness and typically decouple at lower frequencies. The dynamic resonance behavior of many actuator designs can also cause the coil to unwind during operation.

Other actuator designs have used the same magnetic air gap to develop focus and tracking motor forces such that the tracking coil(s) is glued onto the focus(s) coil or vice versa, in an attempt to save parts, space, and weight. In these types of designs, the decoupling frequency of the tracking coil(s) glued onto a freestanding focus coil is typically around 15 kHz, significantly below the preferred decoupling frequency.

SUMMARY OF THE INVENTION

The present invention provides a two-axis electromagnetic actuator design in which a tracking coil and two focus coils are coupled to a lens holder which carries an objective lens. The lens holder and coils coupled thereto are positioned in a magnetic field produced by first and second pairs of permanent magnets. When current is applied to the tracking coil in the presence of the magnetic field produced by the permanent magnets, a force is produced which moves the lens holder and objective lens carried thereon in a tracking direction, typically in a side-to-side direction. Movement in the focusing direction, typically in an up-and-down direction, is effected by applying current to the focus coils positioned between the magnet pairs. As the coils are not freestanding, but rather, are rigidly connected to the lens holder, the coils and lens holder act as a "lumped mass", increasing the decoupling frequency of the coils and improving actuator performance.

The actuator is incorporated in an optical recording system wherein a focused laser beam is utilized to record and read information stored on an optical disc. A servo system determines the amount and direction of the movement of the actuator and objective lens carried thereon needed to bring the laser beam into the desired focus condition with respect to the disc. The permanent magnets are affixed within a base and remain stationary during movement of the actuator. Iron plates may be positioned at the sides of the magnets opposite the lens holder to shunt the magnetic flux and increase the power of the actuator. Flexures, desirably supported by a printed circuit board, are provided to suspend the actuator between the magnet pairs. The circuit board further includes electrical contacts for supplying current to the tracking and focus coils.

The present invention provides an actuator for adjusting the position of an objective lens in an optical data storage system. The actuator includes a first pair of permanent magnets comprising a first permanent magnet having a north pole and a south pole and a second permanent magnet having a north pole and a south pole wherein the north pole of the first permanent magnet is positioned adjacent the south pole of the second permanent magnet and the south pole of the first permanent magnet is positioned adjacent the north pole of the second permanent magnet. The actuator further includes a second pair of permanent magnets comprising a third permanent magnet having a north pole and a south pole and a fourth permanent magnet having a north pole and a south pole wherein the north pole of the third permanent magnet is positioned adjacent the south pole of the fourth permanent magnet and the south pole of the third permanent magnet is positioned adjacent the north pole of the fourth permanent magnet. The actuator includes an objective lens having an optical axis. A lens holder to which the objective lens is mounted is positioned between the first pair of permanent magnets and the second pair of permanent magnets. A first coil is wrapped around the lens holder having an axis substantially parallel to the optical axis of the objective lens, wherein, in response to a flow of electrical current through the first coil, the first coil cooperates with the first pair of permanent magnets and the second pair of permanent magnets to exert a resultant force perpendicular to the axis of the objective lens. A second coil is affixed to the first coil having an axis substantially perpendicular to the axis of the objective lens and a third coil is affixed to the first coil having an axis substantially perpendicular to the axis of the objective lens and generally coaxial with the axis of the second coil. In response to a flow of electrical current through the second coil and the third coil, the second coil cooperates with the first pair of permanent magnets and the third coil cooperates with the second pair of permanent magnets to exert a resultant force parallel to the axis of the objective lens. The second coil and the third coil may have inside portions which define a hollow center, and the inside portions are positioned around and against the first coil. The cooperation of the second coil and the first pair of permanent magnets and the cooperation of the third coil and the second pair of permanent magnets desirably provides the sole force for moving the lens holder parallel to the optical axis of the objective lens. The cooperation of the first coil and the first pair of permanent magnets and the second pair of permanent magnets desirably provides the sole force for making fine adjustments to the position of the lens holder in a direction perpendicular to the axis of the objective lens for fine tracking purposes. The axis of the first coil may advantageously be coaxial with the optical axis of the objective lens.

In another aspect of the invention, a driven unit for an actuator for adjusting the position of an objective lens in an optical data storage system comprises an objective lens having an optical axis and a lens holder to which the objective lens is mounted. A first coil is wrapped around the lens holder having an axis substantially parallel to the optical axis of the objective lens. A second coil is affixed to the first coil having an axis substantially perpendicular to the axis of the objective lens and a third coil is affixed to the first coil having an axis substantially perpendicular to the axis of the objective lens and generally coaxial with the axis of the second coil.

The lens holder may include a pair of opposing sides, each of which defines a groove for receiving and retaining the first coil. The second coil and the third coil may have inside portions which define a hollow center and the inside portions are positioned around and against the first coil. The lens holder may define a pair of opposing faces and the second coil may about one of the pair of opposing faces and the third coil may abut another of the pair of opposing faces. The axis of the first coil may be coaxial with the optical axis of the objective lens. The axis of the second coil may be generally coaxial with the axis of the third coil.

In a further aspect of the invention, an actuator for adjusting the position of an objective lens in an optical data storage system comprises an objective lens having an optical axis. The actuator includes a first pair of permanent magnets, comprising a generally rectangular first permanent magnet defining a face and having a north pole and a south pole, and a generally rectangular second permanent magnet defining a face and having a north pole and a south pole, wherein the north pole of the first permanent magnet is positioned adjacent the south pole of the second permanent magnet and the south pole of the first permanent magnet is positioned adjacent the north pole of the second permanent magnet, the first permanent magnet and the second permanent magnet adjoining along a planar interface perpendicular to the optical axis of the objective lens. The actuator further includes a second pair of permanent magnets, comprising a generally rectangular third permanent magnet having a north pole and a south pole, and a generally rectangular fourth permanent magnet having a north pole and a south pole, wherein the north pole of the third permanent magnet is positioned adjacent the south pole of the fourth permanent magnet and the south pole of the third permanent magnet is positioned adjacent the north pole of the fourth permanent magnet, the third permanent magnet and the fourth permanent magnet adjoining along a planar interface perpendicular to the optical axis of the objective lens. A lens holder to which the objective lens is mounted is positioned between the first pair of permanent magnets and the second pair of permanent magnets. A first coil is secured to the lens holder having an axis generally coaxial with the optical axis of the objective lens, wherein, in response to a flow of electrical current through the first coil, the first coil cooperates with the first pair of permanent magnets and the second pair of permanent magnets to exert a resultant force perpendicular to the axis of the objective lens. The actuator includes a second coil having an axis generally perpendicular to the axis of the objective lens and a third coil having an axis generally perpendicular to the axis of the objective lens and generally coaxial with the axis of the second coil, wherein, in response to a flow of electrical current through the second coil and the third coil, the second coil cooperates with the first pair of permanent magnets and the third coil cooperates with the second pair of permanent magnets to exert a resultant force parallel to the axis of the objective lens. The second coil and the third coil may be oval in shape, each having a pair of elongate sides and shorter ends and wherein further each of the second coil and the third coil is positioned with one of the pair of elongate sides positioned to one side of the planar interface and another of the pair of elongate sides positioned to an opposite side of the planar interface. The second coil and the third coil may have inside portions which define a hollow center, and the inside portions are positioned around and against the first coil. The lens holder may define a pair of opposing faces and the second coil may abut one of the pair of opposing faces and the third coil may abut another of the pair of opposing faces.

In yet another aspect of the invention, an actuator for adjusting the position of an objective lens in an optical data storage system so that an optical beam can be focused on an optical spot comprises an objective lens having an optical axis and a lens holder to which the objective lens is mounted. A first pair of permanent magnets is positioned to one side of the lens holder, comprising a first magnet having a north pole and a south pole and a second permanent magnet having a north pole and a south pole, wherein the north pole of the first permanent magnet and the south pole of the second permanent magnet are positioned adjacent the lens holder, and wherein further the first permanent magnet is positioned closer to the optical spot than the second permanent magnet. A second pair of permanent magnets is positioned to a side of the lens holder opposite the first pair of permanent magnets, the second pair of permanent magnets comprising a third permanent magnet having a north pole and a south pole and a fourth permanent magnet having a north pole and a south pole, wherein the south pole of the third permanent magnet and the north pole of the fourth permanent magnet are positioned adjacent the lens holder, and wherein further the third permanent magnet is positioned closer to the optical spot than the fourth permanent magnet. A first coil is secured to the lens holder having an axis substantially parallel to the optical axis of the objective lens, wherein, in response to a flow of electrical current through the first coil, the first coil cooperates with the first pair of permanent magnets and the second pair of permanent magnets to exert a resultant force perpendicular to the axis of the objective lens. A second coil is secured to the first coil having an axis substantially perpendicular to the axis of the objective lens and a third coil is secured to the first coil having an axis substantially perpendicular to the axis of the objective lens and generally coaxial with the axis of the second coil, wherein, in response to a flow of electrical current through the second coil and the third coil, the second coil cooperates with the first pair of permanent magnets and the third coil cooperates with the second pair of permanent magnets to exert a resultant force parallel to the axis of the objective lens. The second coil and the third coil may have inside portions which define a hollow center, and the inside portions are positioned around and against the first coil. The lens holder may define a pair of opposing faces and the second coil may abut one of the pair of opposing faces and the third coil may abut another of the pair of opposing faces.

DETAILED DESCRIPTION OF THE PREFERRED EMBODIMENT

Figure 1:
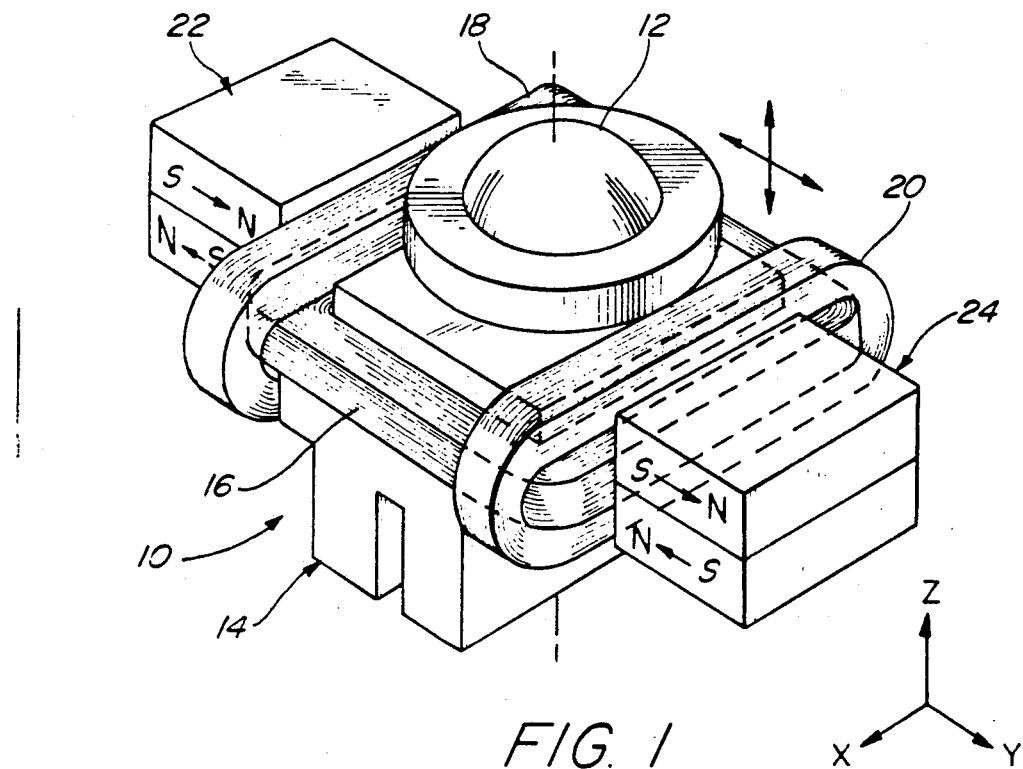
FIG. 1 is a schematic perspective view of an actuator in accordance with the present invention.

FIG. 1 schematically illustrates a two-axis electromagnetic actuator 10 constructed in accordance with the present invention. The actuator 10 includes an objective lens 12 positioned within a lens holder 14 (shown in phantom). A radial or tracking coil 16 is wound around and affixed to the lens holder 14 so as to be generally positioned perpendicular to the Z axis. First and second focus coils 18, 20 are positioned at the sides of the lens holder 14 and are affixed to the tracking coil 16 so as to be generally positioned perpendicular to the Y axis. A first pair of permanent magnets 22 is positioned adjacent the first focus coil 18 and a second pair of permanent magnets 24 is positioned adjacent the second focus coil 20.

Figure 2:
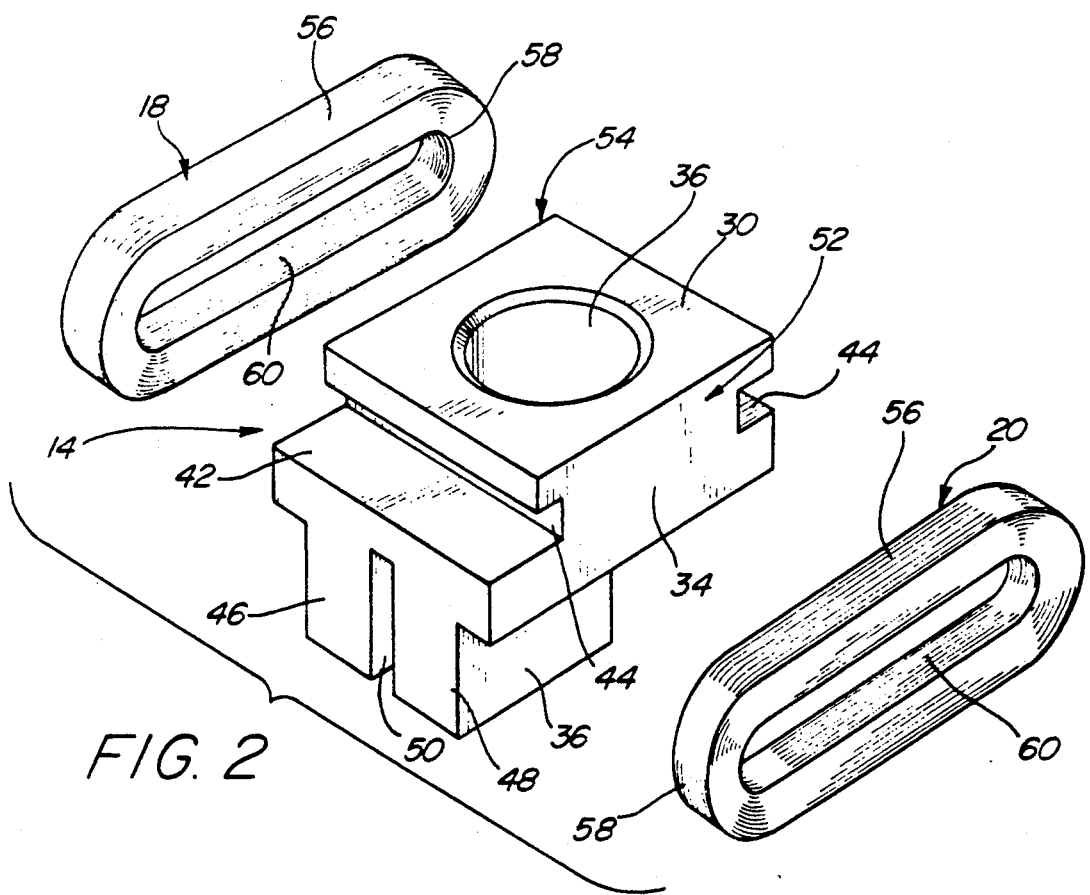
FIG. 2 is a perspective view of the lens holder for the actuator of FIG. 1.

As shown in FIG. 2, the lens holder 14 includes a generally rectangular collar 30 having a circular aperture 32 centered therein. The objective lens 12 is glued into position on top of the circular aperture 32 in the collar 30. The collar 30 is supported by a generally I-shaped platform 34 having a pair of grooves 44 formed at the edges thereof to align and secure the tracking coil 16 therein when it is wound around the platform. A base 36 supporting the platform 34 includes first and second "t" shaped sections 46, 48 having a slot 50 formed therebetween. As will be explained in more detail below, this base 36 acts as a mass balance for the lens holder 14. The collar, platform, and base are aligned on two sides to form first and second opposing faces 52, 54 of the lens holder.

The focus coils 18, 20 are affixed to the tracking coil 16 such that the central axes of the focus coils are coincident, and intersect and are preferably perpendicular to the central axis of the tracking coil. The focus coils 18, 20 are preferably formed from thermally bonded wire having a bond material layer thereon and are preferably wound on a suitable tool or support. The coils 18, 20 are preferably wound around the support as tight as possible without deforming the wire. As those skilled in the art will appreciate, this tightness will vary with the type of wire. During the winding process, the focus coils 18, 20 are preferably heated to melt the bond material layer on the wire, advantageously increasing the solidity and rigidity of the wound coils. The temperature is advantageously selected so as to be high enough to melt the bond material, but not so high as to melt the insulation. After cooling, the coils 18, 20 are removed from the support and these freestanding coils are then affixed to the tracking coil 16 in a well-known manner using a suitable adhesive.

Each freestanding focus coil 18, 20 is oval in shape and has two elongate sides 56 joined by a pair of shorter ends 58. The sides 56 and ends 58 of the coils 18, 20 surround an open or hollow annular center 60. The tracking coil 16 is wound around the I-shaped platform 34 of the lens holder 14 such that the coil is received by and secured within the grooves 44 and positioned against the opposed faces 52, 54 of the lens holder. Referring to FIG. 1 and FIG. 2, the two focus coils 18, 20 are affixed to the tracking coil 16 such that the tracking coil is positioned within the center 60 of each focus coil. The focus coils 18, 20 are further positioned such that each coil abuts the opposed faces 52, 54 of the lens holder 14. In this manner, the tracking coil 16 and focus coils 18, 20 are rigidly secured to the lens holder 14, thereby creating a more rigid driven unit that behaves as a single lumped mass.

Figure 6:
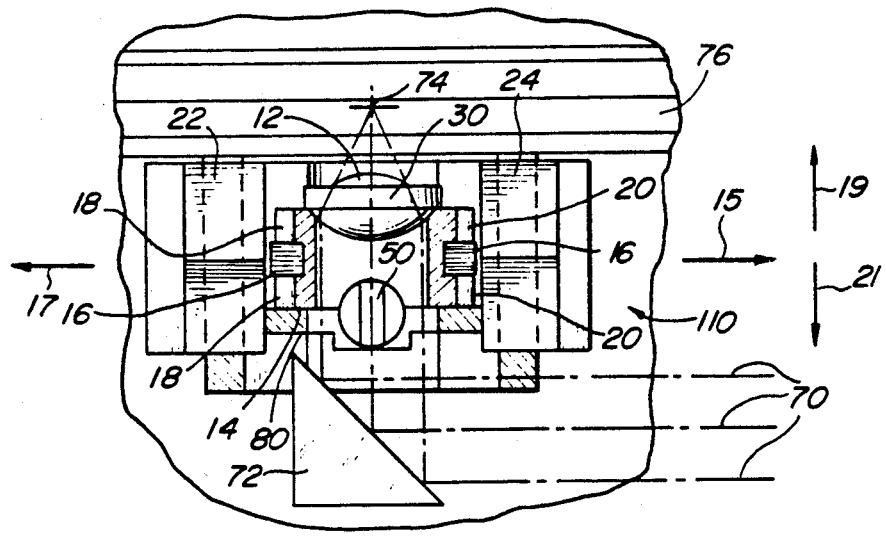
FIG. 6 is a front elevational view of the recording system of FIG. 3.

Referring to FIGS. 3, 4, 5, and 6, in operation, a light source element (not shown), typically a laser diode, emits a laser light beam 70 (FIG. 6). The beam 70 is incident upon a prism 72 which orthogonally reflects the light beam upward toward the objective lens 12. The lens 12 converges the beam 70 to a precise focal point or optical spot 74 on the surface of a recording medium, such as an optical disc 76. Upon striking the disc 76, the light beam 70 is altered by the information stored on the disc 76 and is reflected as a divergent light beam carrying information identical to that encoded on the disc 76. This reflected beam re-enters the objective lens 12 where it is collimated and is again reflected by the prism 72 to a photodetector (not shown) which detects the data stored on the disc 76. In addition, if the light beam falling on the photodetector is out of focus or misaligned, the amount of misalignment or defocusing is measured electronically and used as feedback for a servo system (not shown) well-known in the art which properly realigns the objective lens 12 relative to the disc 76.

Figure 4:
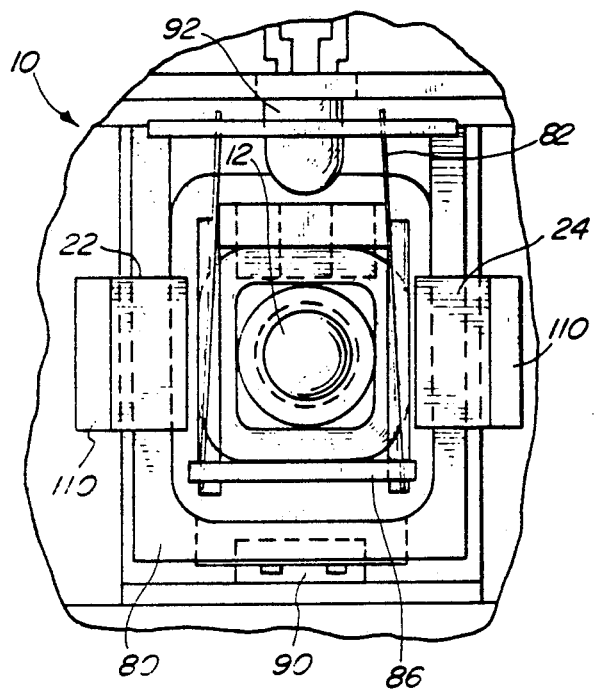
FIG. 4 is a top plan view of the recording system of FIG. 3.
Figure 5:
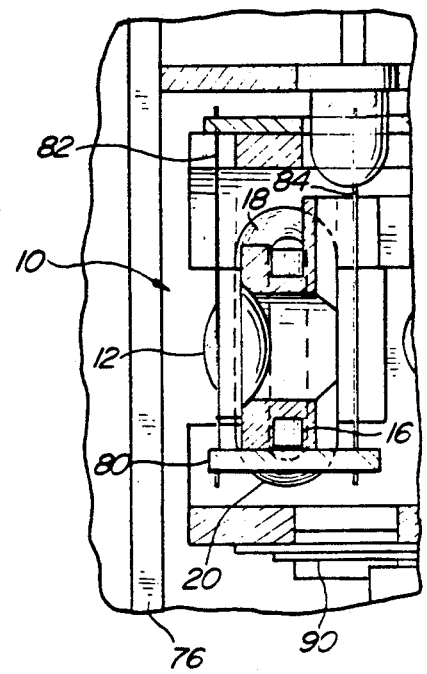
FIG. 5 is a right side elevational view of the recording system of FIG. 3.

It is these feedback signals which determine the amount and direction of movement of the actuator 10 and objective lens 12 carried thereon needed to bring the light beam into the desired focus condition with respect to the disc 76. When radial or tracking movement is required to position the objective lens 12 beneath the center of a selected track on the optical disc 76, current is applied to the tracking coil 16. The current interacts with the magnetic field produced by the permanent magnet pairs 22, 24 to produce forces which move the actuator 10 in the tracking direction. The forces are generated according to the Lorentz law $F = B \times I \cdot l$, wherein F represents the force acting on the tracking coil 16, B represents the magnetic flux density of the magnetic field between the permanent magnet pairs 22, 24, I represents the current through the tracking coil 16, and l represents the length of the coil 16. When the current I applied to the tracking coil 16 travels through the coil in a counterclockwise direction (as shown in FIG. 4), a force is produced which moves the actuator 10 to the right (as shown in FIG. 6) by the arrow 15. When the current applied to the coil 16 travels through the coil in the opposite, or clockwise direction (as shown in FIG. 4), a force is produced which moves the actuator 10 to the left (as shown in FIG. 6) by the arrow 17. In this manner, the actuator 10 is moved radially to position the objective lens 12, beneath the center of a desired information track on the surface of the optical disc 76.

Movement of the actuator 10 to effect focusing is produced when current is generated in the two focus coils 18, 20 affixed to the tracking coil 16 at the sides of the lens holder 14. When the current through these coils 18, 20 is applied so that the current travels in a counterclockwise in the plane of FIG. 5, a force is produced which acts to move the lens holder 14 and objective lens 12 upward (as shown by the arrow 19 in FIG. 6) towards the surface of the optical disc 76. Conversely, when current is applied such that current travels through the coils 18, 20 in a direction clockwise in the plane of FIG. 5, a force is produced which moves the lens holder 14 downward (as shown in FIG. 6) by the arrow 21, or farther away from the surface of the disc 76.

Because the tracking coil 16 is coupled to the lens holder 14, and, in turn, the focus coils 18, 20 are coupled directly to the tracking coil 16, the coils and lens holder behave as a "lumped mass" and the frequencies at which the coils decouple with respect to the lens holder are significantly increased. Decoupling frequencies of up to 30 kHz have been measured with the actuator design of the present invention.

Figure 3:
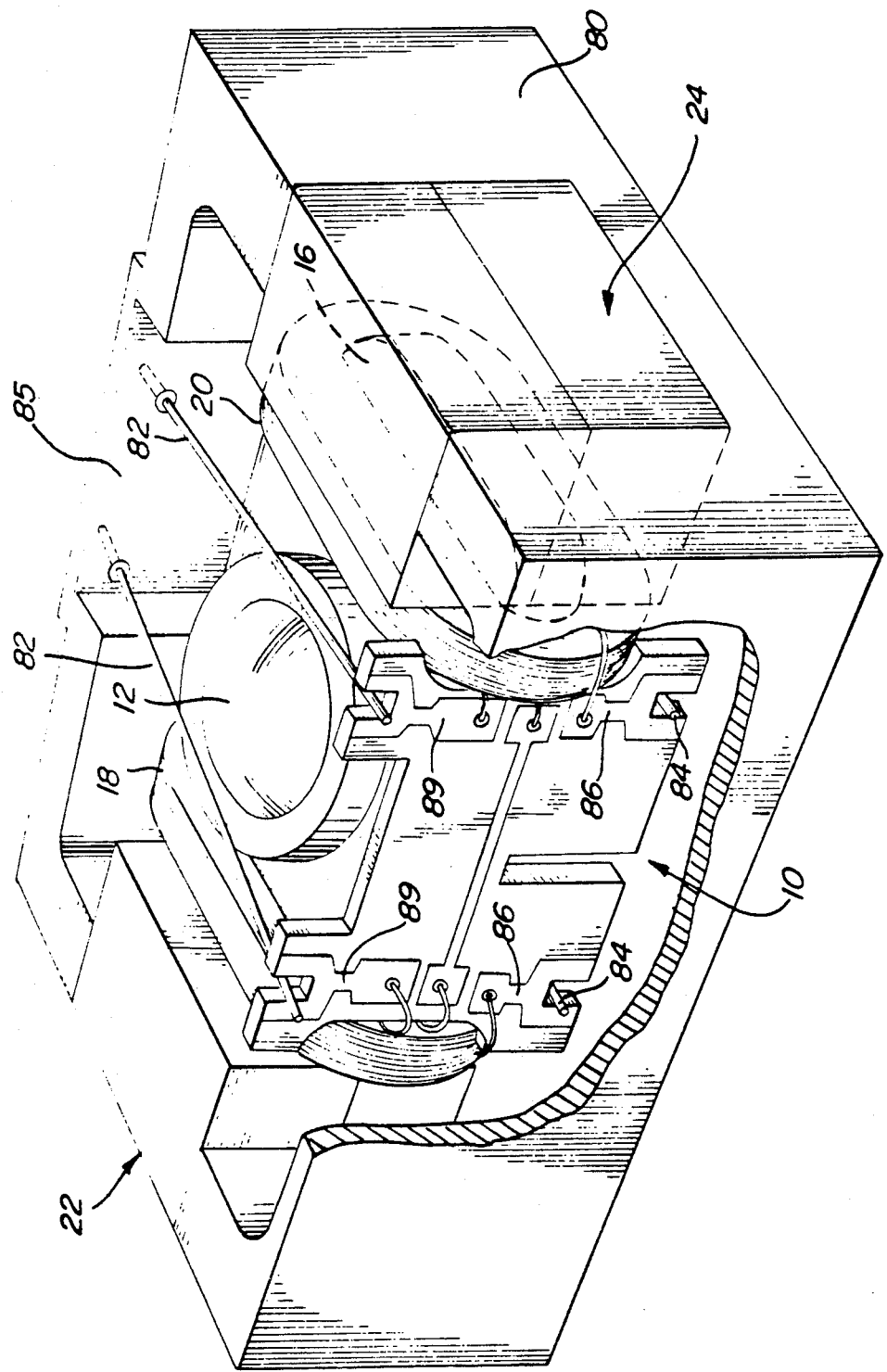
FIG. 3 is a perspective view of the actuator of Figure 1 within an optical recording system.

Referring to FIG. 3, the magnet pairs 22, 24, remain stationary during movement of the lens holder 14 and are affixed within a generally rectangular housing or base 80. Two pairs of suspension wires 82, 84 are provided to suspend the objective lens holder 14 between the magnet pairs 22, 24. The wire pairs 82, 84 are attached to a stationary printed circuit board 85 which is positioned vertically with respect to the lens holder 14 and acts as a support for the wire pairs 82, 84. The wire pairs 82, 84 are further attached to electrical contacts on a moving circuit board 87 which is attached to the lens holder 14, again in a vertical orientation. In particular, a free end of each focus coil 18, 20 is soldered to electrical contacts 86 such that current is supplied to the focus coils 16, 18, through the second or bottom wire pair 84 which is also soldered to the contacts 86. The other free end of each focus coil 18, 20 is soldered to the circuit board 87 and joined along an electrical contact 88. The free ends of the tracking coil 16 and the first or top suspension wire pair 82 are soldered to electrical contacts 89 on the moving circuit board 87 such that current is supplied to the coil through the top pair of wires. The base 36 of the lens holder 14 acts as a mass balance by offsetting the weight of the objective lens 12 and the circuit boards 85, 87 to which the lens holder 14 is attached via the wire pairs 82, 84.

Alternatively, four flexures could be used to suspend the lens holder 14. The flexures would desirably act as parallel leaf springs which permit the objective lens holder 14 to move up-and-down for focusing while prohibiting changes in the orientation of the optical axis of the lens 12. In this manner, the objective lens 12 will not be canted with respect to the surface of the optical disc 76 as the lens holder 14 is moved in the focusing direction. Each flexure further includes narrow portions which operate as a hinge so as to allow some movement of the lens holder 14 in a side-to-side direction for tracking adjustments.

In addition to accomplishing fine focusing and tracking movements of the lens holder 14, it is often desirable to detect the position of the lens holder 14 with respect to the base 80. To ascertain the position of the objective lens 16 in both a tracking and/or a focusing direction, the actuator 10 is equipped with a position sensor 90. Preferably, a light emitting diode (LED) 92 is positioned on one side of the actuator 10, opposite the sensor 90, such that when the objective lens holder 14 is centered within the base 80, light emitted by the LED 92 will shine through the slot 50 in the lens holder 14 to illuminate a portion of the sensor 90. A position sensitive detector is advantageously implemented as the sensor 90 and the sensor is positioned such that when the lens holder 14 is centered within the base 80, light emitted by the LED 92 will pass through the slit 50 and will be distributed on the detector. Thus, as the lens holder 14 moves in a side-to-side direction, i.e., the tracking direction, various portions of the sensor 90 will be illuminated, indicative of the position of the lens holder 14 in the tracking direction. Consequently, when the lens holder 14 is not centered with respect to the base 80, a portion of the light emitted from the LED 92 will be blocked by the lens holder 14, causing an unequal distribution of light on the sensor 90. This unequal distribution may then be analyzed to determine the position of the lens holder 14 with respect to the base 80 by well-known circuitry and methods.

When a control signal is generated by the servo system, a given current is applied to the tracking coil 16 and/or the focus coils 18, 20 depending on the direction in which the displacement of the lens holder 14 and objective lens 16 attached thereto is required. Such servo systems and feedback circuits which control the amount of current are well known in the art. As discussed above, this current interacts with the electromagnetic field produced by the permanent magnet pairs 22, 24 to create a force which displaces the lens holder 14 and objective lens 12 attached thereto in the appropriate focusing or tracking direction.

Figure 7:
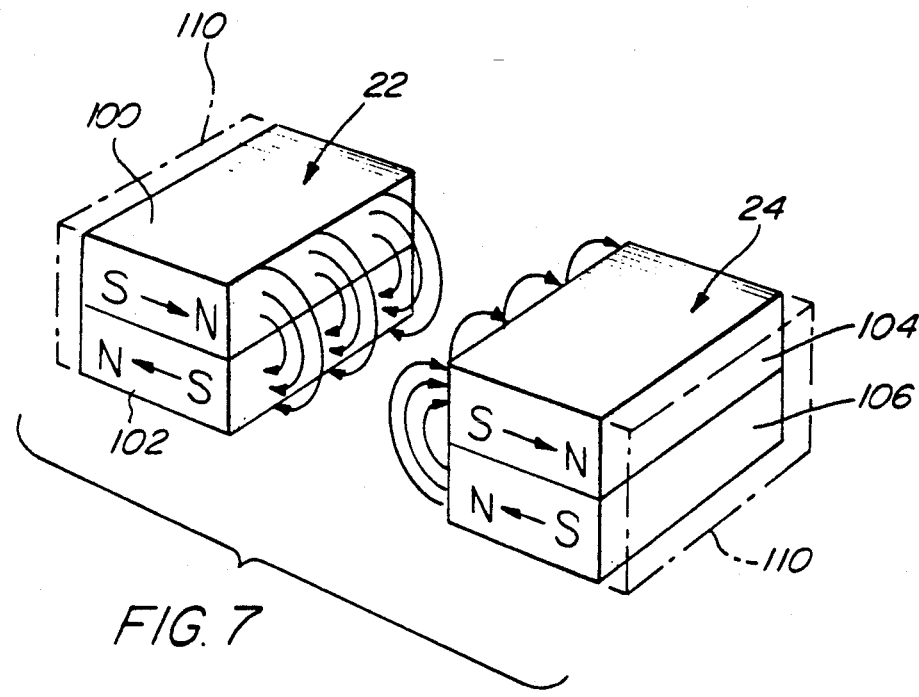
FIG. 7 is a schematic perspective view illustrating the magnetic fields produced by the magnet pairs of the actuator of FIG. 1.
Figure 8:
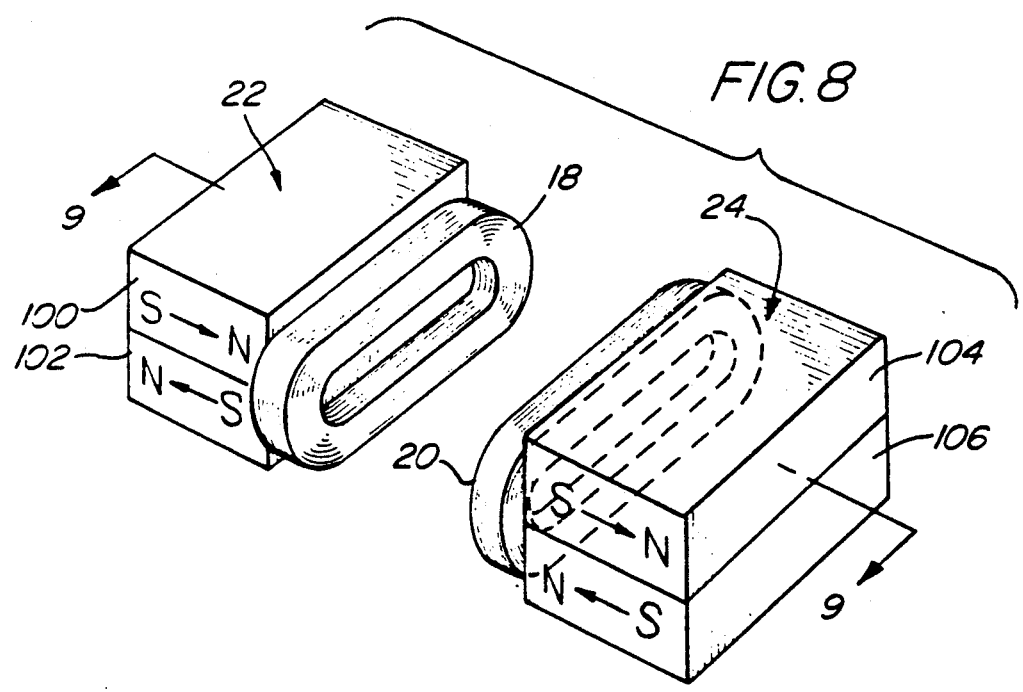
FIG. 8 is a perspective view of the focus coils and permanent magnets of the actuator of FIG. 1.

The operation and structure of the focus and tracking mechanism will now be described in greater detail. As illustrated in FIGS. 7 and 8, the permanent magnet pairs 22, 24, are oriented with opposite poles opposing each other. More specifically, the first pair of magnets 22 includes a first or top magnet 100 and a second or bottom magnet 102 in a stacked relationship joined along a planar interface, such that the north pole of the top magnet 100 and the south pole of the bottom magnet 102 (as illustrated in FIG. 8) are positioned adjacent the lens holder 14. The second pair of magnets 24 includes a third or top magnet 104 and a fourth or bottom magnet 106 in a stacked relationship joined along a planar interface having the opposite orientation, such that the south pole of the top magnet 104 and the north pole of the bottom magnet 106 (as illustrated in FIG. 8) are positioned adjacent the lens holder 14. As shown in FIG. 7, the field lines produced by this orientation originate at the north pole of each magnet pair 22, 24, and terminate at the south pole of each magnet pair. Iron plates 110 (shown in phantom for clarity) may be attached to each magnet pair 22, 24 on the sides of the permanent magnets opposite the lens holder 14. The iron plates 110 effectively "shunt" the magnetic flux emanating from the sides of the magnets 100, 102, 104, 106, opposite the lens holder 14, increasing the magnetic flux adjacent the lens holder and producing a corresponding increase in actuator power.

Figure 9:
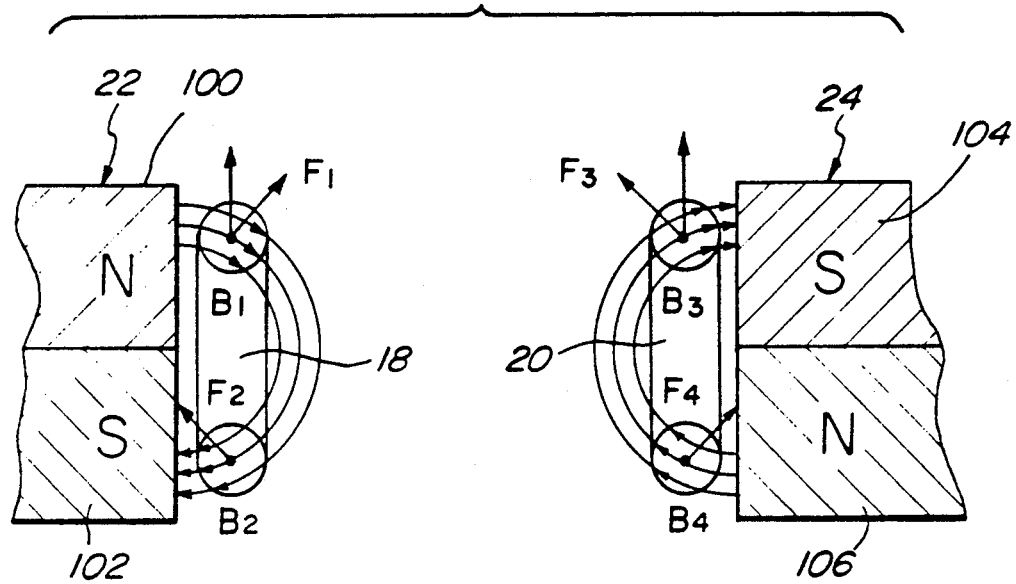
FIG. 9 is a schematic cross-sectional view of the focus coils and permanent magnets of the actuator of FIG. 1 taken along lines 9—9 of FIG. 8 illustrating the focus forces acting on the actuator.

The focus forces acting on the actuator 10 are illustrated in more detail in FIG. 9. When a current I is applied to the focus coils 18, 20 in the direction indicated, i.e., out of the plane of the figure adjacent the top magnets 100, 104 and into the plane of the figure adjacent the bottom magnets 102, 106, forces $F_{FOCUS1}$ and $F_{FOCUS2}$ are generated which are translated to the lens holder 14 to accelerate or decelerate the moving mass (lens holder) and to the suspension wire pairs 82, 84, bending the suspension wires to move the lens holder 14 and associated objective lens 12 closer to the optical disc 76. Because the lines of magnetic flux curve as described above, the direction of the magnetic field varies vertically in the focus coils 18, 20. For example, for the focus coil 18 positioned adjacent the first magnet pair 22, in the plane of FIG. 9 which vertically bisects the coil adjacent the top magnet 100, the magnetic field has a first direction at the top of the coil 18 given by $B_1$, and a second direction in the bisecting plane adjacent the bottom magnet 102 at the bottom of the coil 18 given by $B_2$. In accordance with the Lorentz law $F = B \times I \cdot 1$, the current interacts with the magnetic field $B_1$ to produce a first force component F1 acting on the portion of the focus coil 18 adjacent the top magnet 100, and interacts with the magnetic field $B_2$ to produce a second force component F2 acting on the portion of the focus coil adjacent the bottom magnet 102. As the magnitude of the horizontal portions of the force components F1 and F2 are equal in magnitude but opposite in direction, these horizontal force components cancel one another in accordance with the rules of vector addition to produce a resultant force $F_{FOCUS1}$ which is vertically upward in the plane of FIG. 9. Similarly, the horizontal force components throughout the rest of the coil 18 are canceled, giving a vertical resultant force which is strictly vertically upward (i.e., is vertically upward and has effectively no horizontal component) and therefore moves the lens holder 14 closer to the surface of the optical disc 76.

As the lines of flux generated by the second magnet pair 24 curve oppositely of those generated by the first magnet pair 22, the direction of the magnetic field at any point in the focus coil 20 is different than the direction of the field at the corresponding point in the focus coil 18. Again, because the flux lines curve, the direction of the field acting on the coil 20 varies vertically along the coil. In the plane of FIG. 9 which vertically bisects the coil adjacent the top magnet 104 of the second magnet pair 24, the magnetic field direction is given by $B_3$ at the top of the coil 20 and a force is generated in accordance with Lorentz law in the direction $F_3$, while in the bisecting plane adjacent the bottom magnet 106, the magnetic field direction is given by $B_4$ at the bottom of the coil 20 and a force $F_4$ is generated. The forces add to produce a resultant force $F_{FOCUS2}$, which, as shown, is strictly vertically upward.

Thus, it can be seen that the forces $F_{FOCUS1}$ and $F_{FOCUS2}$, act on the focus coils 18 and 20, respectively, to move the lens holder 14 upward. Conversely, if the current was applied to the focus coils 18, 20, in the opposite direction, forces would be generated to move the lens holder 14 downward, or farther away from the surface of the optical disc 76. By moving the objective lens 12 closer to or farther away form the surface of the optical disc 76, the focus coils 18, 20 act to precisely focus the laser beam exiting the objective lens 12 on the disc 76.

Figure 10:
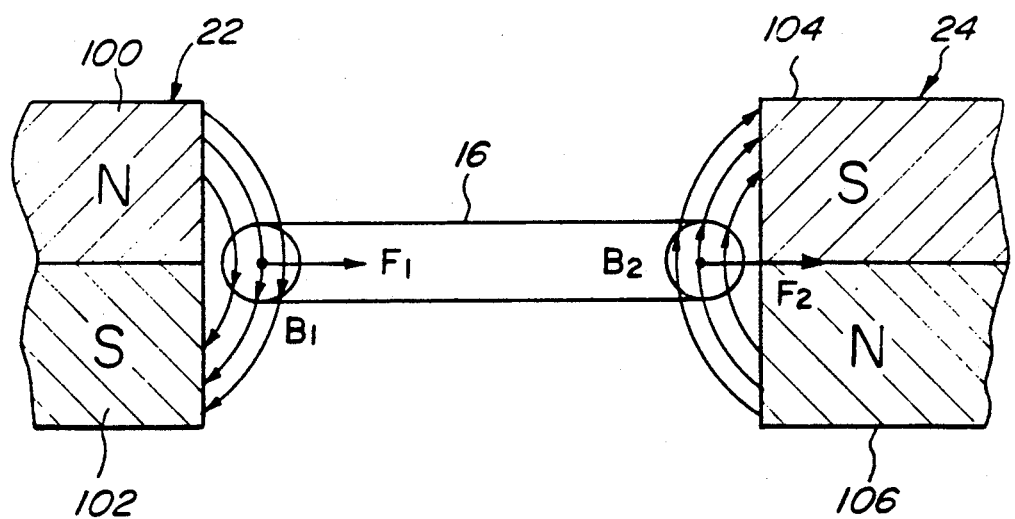
FIG. 10 is a schematic cross-sectional view of the tracking coil and permanent magnets of the actuator of FIG. 1 illustrating the tracking forces acting on the actuator.

As illustrated in FIG. 10, movement of the actuator 10 to effect fine tracking is produced when current is generated in the tracking coil 16 affixed to the lens holder 14. In the plane of FIG. 10 which horizontally bisects the tracking coil 16, a magnetic field having direction B1 acts on the cross-section of the coil 16 located closest to the first magnet pair 22 and a magnetic field having the direction B2 acts on the cross-section of the coil located closest to the second magnet pair 22. If, for example, a current I is applied in a counter-clockwise direction around the tracking coil 16, a force F1 acts on the portion of the tracking coil adjacent the first magnet pair 22 and a force F2 acts on the portion of the tracking coil adjacent the second magnet pair 24. These forces add under the laws of vector addition to produce a resultant force $F_{TRACK}$ which acts to move the lens holder 14 to the right in the plane of FIG. 10. When the forces act on the tracking coil 16 in this manner, they are translated through the lens holder 14 to accelerate or decelerate the moving mass (lens holder) and to the suspension wire pairs 82, 84 which bend in the corresponding direction to move the objective lens 12 and precisely center the laser beam exiting therefrom within the center of a selected data track on the surface of the optical disc 76. Conversely, if a current I is applied in a clockwise direction around the coil 16, a resultant force is produced which moves the lens holder 14 to the left in the plane of the FIG. 10.

Thus, it can be seen that the coupling arrangement of the present invention further reduces the distance between the resultant forces acting on the coils 16, 18, 20 and the optical axis of the objective lens 12, decreasing adverse modes of motion such as pitch, roll, and yaw during focusing and tracking operations.

With the actuator design of the present invention, only two pairs of permanent magnets, i.e., four total magnets, and three coils are required to effect movement in both the tracking and focusing directions, thereby reducing both the size and weight of actuator and yielding higher decoupling frequencies. As the component count for the actuator is low, the actuator is easy to manufacture and assemble as compared to prior actuator designs having many more coils, magnets, and pole pieces. In addition, because the tracking and focus coils 16, 18, 20 are coupled directly to the lens holder 14 and are not wound around yokes or poles, coil rigidity and resonance frequency response is significantly improved. Further, direct coupling of the coils 16, 18, 20, reduces the distance between the point where the effective tracking and focus forces are generated and the optical axis of the objective lens, decreasing adverse motions such as pitch, roll, and yaw.

The present invention improves motor performance; Figures of merit as high as 130 m/s$^2$/sq. rt. (W) for the focus direction and 70 m/s$^2$/sq. rt. (W) for the radial direction have been measured for actuators constructed in accordance with the present invention, significantly higher than previously realized. As those skilled in the art will recognize, the design of the present invention also ensures that approximately 40% of the coil wire is utilized, increasing the efficiency of the actuator over prior designs.

The preferred embodiment has been described with reference to the coordinate system illustrated in FIG. 1 wherein the optical disc 76 is positioned above the objective lens 12 such that focusing is effected by moving the actuator 10 up and down along the Z-axis and tracking movement is effected by moving the actuator in a side-to-side motion along the Y-axis. Those skilled in the art will recognize, however, that the actuator 10 of the present invention could also be incorporated in optical systems having different orientations than those illustrated.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to embraced within their scope.

We claim:

1. An actuator for adjusting the position of an objective lens in an optical data storage system, comprising:
   a first pair of permanent magnets, comprising a first permanent magnet having a north pole and a south pole, and a second permanent magnet having a north pole and a south pole, wherein said north pole of said first permanent magnet is positioned adjacent said south pole of said second permanent magnet and said south pole of said first permanent magnet is positioned adjacent said north pole of said second permanent magnet;
   a second pair of permanent magnets, comprising a third permanent magnet having a north pole and a south pole, and a fourth permanent magnet having a north pole and a south pole, wherein said north pole of said third permanent magnet is positioned adjacent said south pole of said fourth permanent magnet and said south pole of said third permanent magnet is positioned adjacent said north pole of said fourth permanent magnet;
   an objective lens having an optical axis;
   a lens holder to which said objective lens is mounted positioned between said first pair of permanent magnets and said second pair of permanent magnets;
   a first coil wrapped around said lens holder having an axis substantially parallel to said optical axis of said objective lens, wherein, in response to a flow of electrical current through said first coil, said first coil cooperates with said first pair of permanent magnets and said second pair of permanent magnets to exert a resultant force perpendicular to said axis of said objective lens;
   a second coil affixed to said first coil having an axis substantially perpendicular to said axis of said objective lens; and,
   a third coil affixed to said first coil having an axis substantially perpendicular to said axis of said objective lens and generally coaxial with said axis of said second coil, wherein, in response to a flow of electrical current through said second coil and said third coil, said second coil cooperates with said first pair of permanent magnets and said third coil cooperates with said second pair of permanent magnets to exert a resultant force parallel to said axis of said objective lens.

2. The actuator of claim 1, wherein said second coil and said third coil have inside portions which define a hollow center, and said inside portions are positioned around and against said first coil.

3. The actuator of claim 2, wherein said cooperation of said second coil and said first pair of permanent magnets and said cooperation of said third coil and said second pair of permanent magnets provide the sole force for moving said lens holder parallel to said optical axis of said objective lens.

4. The actuator of claim 1, wherein said cooperation of said first coil and said first pair of permanent magnets and said second pair of permanent magnets provides the sole force for making fine adjustments to the position of said lens holder in a direction perpendicular to said axis of said objective lens for fine tracking purposes.

5. The actuator of claim 4, wherein said axis of said first coil is coaxial with said optical axis of said objective lens.

6. The actuator of claim 5, wherein said second coil and said third coil have inside portions which define a hollow center, and said inside portions are positioned around and against said first coil.

7. A driven unit for an actuator for adjusting the position of an objective lens in an optical data storage system, comprising:
   an objective lens having an optical axis;
   a lens holder to which said objective lens is mounted;
   a first coil wrapped around said lens holder having an axis substantially parallel to said optical axis of said objective lens;
   a second coil affixed to said first coil having an axis substantially perpendicular to said axis of said objective lens; and
   a third coil affixed to said first coil having an axis substantially perpendicular to said axis of said objective lens, wherein said second coil and said third coil have inside portions which define a hollow center, and said inside portions are positioned around and against said first coil.

8. The drive unit of claim 7, wherein said lens holder includes a pair of opposing sides, each of which defines a groove for receiving and retaining said first coil.

9. The driven unit of claim 8, wherein said lens holder defines a pair of opposing faces and said second coil abuts one of said pair of opposing faces and said third coil abuts another of said pair of opposing faces.

10. The driven unit of claim 7, wherein said axis of said first coil is coaxial with said optical axis of said objective lens.

11. The driven unit of claim 10, wherein said axis of said second coil is generally coaxial with said axis of said third coil.

12. An actuator for adjusting the position of an objective lens in an optical data storage system, comprising:
   an objective lens having an optical axis;
   a first pair of permanent magnets, comprising a generally rectangular first permanent magnet defining a face and having a north pole and a south pole, and a generally rectangular second permanent magnet defining a face and having a north pole and a south pole, wherein said north pole of said first permanent magnet is positioned adjacent said south pole of said second permanent magnet and said south pole of said first permanent magnet is positioned adjacent said north pole of said second permanent magnet, said first permanent magnet and said second permanent magnet adjoining along a planar interface perpendicular to said optical axis of said objective lens;
   a second pair of permanent magnets, comprising a generally rectangular third permanent magnet having a north pole and a south pole, and a generally rectangular fourth permanent magnet having a north pole and a south pole, wherein said north pole of said third permanent magnet is positioned adjacent said south pole of said fourth permanent magnet and said south pole of said third permanent magnet is positioned adjacent said north pole of said fourth permanent magnet, said third permanent magnet and said fourth permanent magnet adjoining along a planar interface perpendicular to said optical axis of said objective lens;
   a lens holder to which said objective lens is mounted positioned between said first pair of permanent magnets and said second pair of permanent magnets;
   a first coil secured to said lens holder having an axis generally coaxial with said optical axis of said objective lens, wherein, in response to a flow of electrical current through said first coil, said first coil cooperates with said first pair of permanent magnets and said second pair of permanent magnets to exert a resultant force perpendicular to said axis of said objective lens;
   a second coil having an axis generally perpendicular to said axis of said objective lens; and,
   a third coil having an axis generally perpendicular to said axis of said objective lens and generally coaxial with said axis of said second coil, wherein, in response to a flow of electrical current through said second coil and said third coil, said second coil cooperates with said first pair of permanent magnets and said third coil cooperates with said second pair of permanent magnets to exert a resultant force parallel to said axis of said objective lens.

13. The actuator of claim 12, wherein said second coil and said third coil are oval in shape, each having a pair of elongate sides and shorter ends and wherein further each of said second coil and said third coil is positioned with one of said pair of elongate sides positioned to one side of said planar interface and another of said pair of elongate sides positioned to an opposite side of said planar interface.

14. The actuator of claim 13, wherein said second coil and said third coil have inside portions which define a hollow center, and said inside portions are positioned around and against said first coil.

15. The actuator of claim 14, wherein said lens holder defines a pair of opposing faces and said second coil abuts one of said pair of opposing faces and said third coil abuts another of said pair of opposing faces.

16. An actuator for adjusting the position of an objective lens in an optical data storage system so that an optical beam can be focused on an optical spot, comprising:
   an objective lens having an optical axis;
   a lens holder to which said objective lens is mounted;
   a first pair of permanent magnets positioned to one side of said lens holder, comprising a first permanent magnet having a north pole and a south pole and a second permanent magnet having a north pole and a south pole, wherein said north pole of said first permanent magnet and said south pole of said second permanent magnet are positioned adjacent said lens holder, and wherein further said first permanent magnet is positioned closer to said optical spot than said second permanent magnet;
   a second pair of permanent magnets positioned to a side of said lens holder opposite said first pair of permanent magnets, said second pair of permanent magnets comprising a third permanent magnet having a north pole and a south pole and a fourth permanent magnet having a north pole and a south pole, wherein said south pole of said third permanent magnet and said north pole of said fourth permanent magnet are positioned adjacent said lens holder, and wherein further said third permanent magnet is positioned closer to said optical spot than said fourth permanent magnet;
   a first coil secured to said lens holder having an axis substantially parallel to said optical axis of said objective lens, wherein, in response to a flow of electrical current through said first coil, said first coil cooperates with said first pair of permanent magnets and said second pair of permanent magnets to exert a resultant force perpendicular to said axis of said objective lens;

a second coil secured to said first coil having an axis generally perpendicular to said axis of said objective lens; and, a third coil secured to said first coil having an axis substantially perpendicular to said axis of said objective lens and generally coaxial with said axis of said second coil, wherein, in response to a flow of electrical current through said second coil and said third coil, said second coil cooperates with said first pair of permanent magnets and said third coil cooperates with said second pair of permanent magnets to exert a resultant force parallel to said axis of said objective lens.

17. The actuator of claim 16, wherein said second coil and said third coil have inside portions which define a hollow center, and said inside portions are positioned around and against said first coil.

18. The actuator of claim 17, wherein said lens holder defines a pair of opposing faces and said second coil abuts one of said pair of opposing faces and said third coil abuts another of said pair of opposing faces.

* * * * *